United States Patent [19]

Machida et al.

[11] Patent Number: 5,554,695

[45] Date of Patent: Sep. 10, 1996

[54] STYRENIC COPOLYMER AND PROCESS FOR PRODUCING SAME

[75] Inventors: Shuji Machida; Toshinori Tazaki, both of Sodegaura, Japan

[73] Assignee: Idemitsu Kosan Co. Ltd., Tokyo, Japan

[21] Appl. No.: 433,966

[22] Filed: May 4, 1995

Related U.S. Application Data

[62] Division of Ser. No. 259,166, Jun. 13, 1994, which is a continuation of Ser. No. 890,581, filed as PCT/JP91/01580, Nov. 19, 1991, abandoned.

[30] Foreign Application Priority Data

Nov. 21, 1990 [JP] Japan .................................. 2-314327
Mar. 27, 1991 [JP] Japan .................................. 3-89509

[51] Int. Cl.$^6$ .................................................. C08F 297/06
[52] U.S. Cl. .......................... 525/268; 525/247; 525/274; 525/275; 525/285; 525/291; 525/299; 525/301; 525/307; 525/308; 526/240; 526/241; 526/272; 526/279; 526/318.25; 526/323; 526/324; 526/347
[58] Field of Search .................... 526/272, 240, 526/241, 347, 318.25, 324, 279, 323; 525/247, 268, 285, 299, 301, 274, 275, 291, 307, 308

[56] References Cited

U.S. PATENT DOCUMENTS

| | | |
|---|---|---|
| 5,250,629 | 10/1993 | Tani et al. .......................... 526/347 X |
| 5,362,814 | 11/1994 | Machida et al. . |
| 5,378,777 | 1/1995 | Watanabe et al. . |
| 5,391,626 | 2/1995 | Machida et al. . |
| 5,412,024 | 5/1995 | Okada et al. . |
| 5,418,276 | 5/1995 | Machida et al. . |
| 5,418,290 | 5/1995 | Machida et al. . |

Primary Examiner—Fred Teskin
Attorney, Agent, or Firm—Oblon, Spivak, McClelland, Maier & Neustadt, P.C.

[57] ABSTRACT

There are disclosed a styrenic copolymer which comprises at least one structural unit represented by the general formula (I)

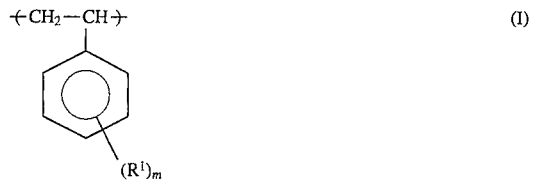

and a structural unit represented by the general formula (II)

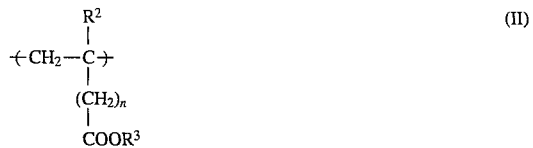

or a structural unit represented by the general formula (IX)

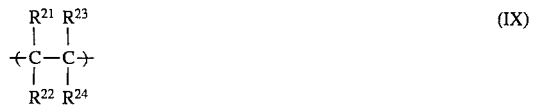

wherein the symbols are each as previously defined in the specification, the structural unit (II) or (IX) being contained in an amount of 0.01 to 99.9 mol %; and a process for the production of the above copolymer.

The above styrenic copolymer has a high degree of syndiotactic configuration in the stereoregularity of the main chain of the structural unit (I) as well as adhesivity and compatibility with a resin of a different type.

2 Claims, 7 Drawing Sheets

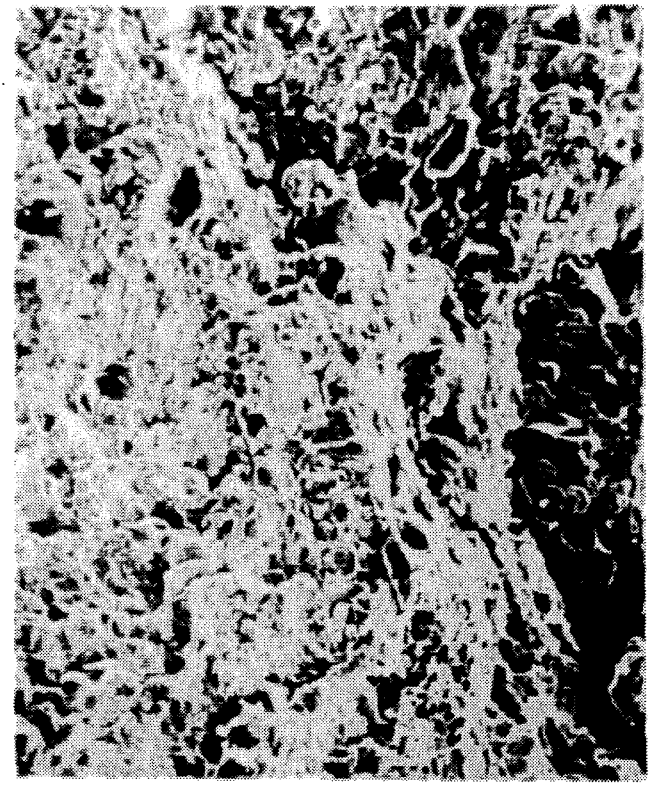
12
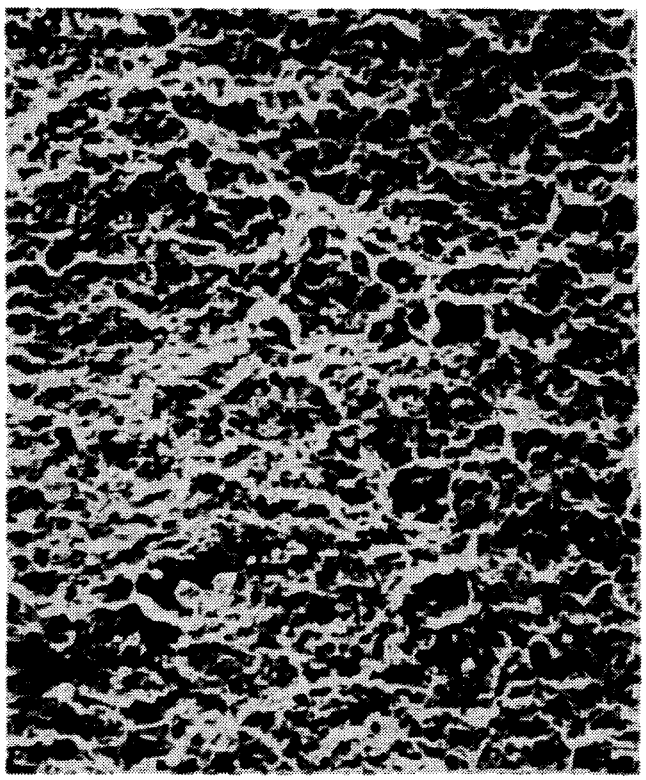
11
FIG. 4

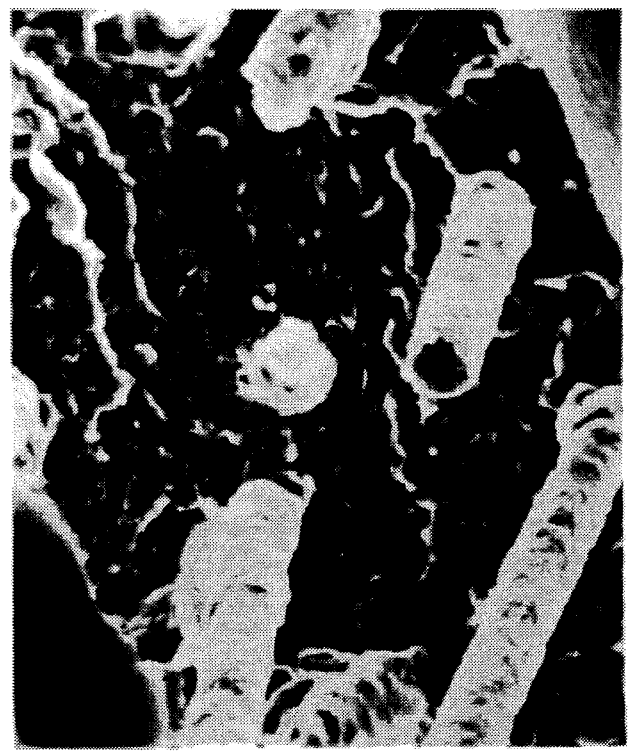
FIG. 5

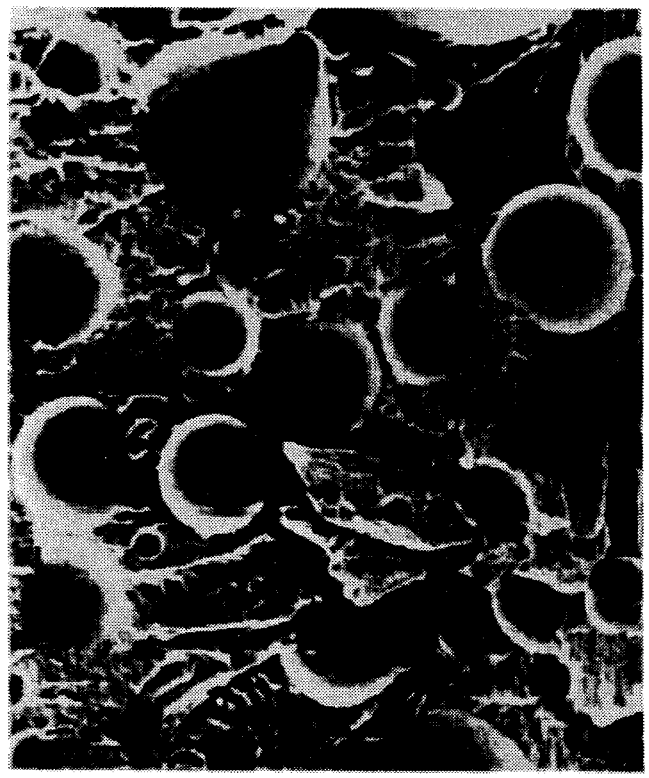
FIG. 6

STYRENIC COPOLYMER AND PROCESS FOR PRODUCING SAME

This is a Division, of application Ser. No. 08/259,166 filed on Jun. 13, 1994, which is a continuation of 07/890,581 filed on Jul. 10, 1992, now abandoned, which was filed as International Application No. PCT/JP91/015.80 on Nov. 19, 1991.

TECHNICAL FIELD

The present invention relates to a styrenic copolymer and a process for producing the same.. More particularly, it pertains to a styrenic copolymer having a stereospecific structure which comprises a structural unit derived from a styrenic monomer and a structural unit derived from an unsaturated hydrocarbon monomer unit containing a heteroatom and to a process for efficiently producing the copolymer.

BACKGROUND ART

Heretofore, styrenic polymers produced by the radical polymerization method have been molded to various shapes by various molding methods and widely used as domestic electrical appliances, office machines, household goods, packaging containers, toys, furnitures, synthetic papers and other industrial materials. Because of their atactic configuration in stereochemical structure, however, such styrenic polymers have suffered the disadvantages of inferior heat resistance and chemical resistance.

In order to solve the above-mentioned disadvantages of the styrenic polymers having atactic configuration, the group of the present inventors succeeded in the development of the styrenic polymers having a high degree of syndiotactic configuration, and further the styrenic copolymers of a styrene monomer and other comonomer (refer to Japanese Patent Application Laid-Open Nos. 104818/1987, 187708/1987 and 241009/1988).

These developed styrenic polymers or copolymers each having syndiotactic configuration are excellent in heat resistance, chemical resistance and electrical properties and are expected to find application use in a variety of fields.

The above-mentioned polymer, especially the syndiotactic polystyrene has a glass transition temperature in the range of 90° to 100° C. and a melting point in the range of 250° to 275° C.

Although the heat distortion temperature of the syndiotactic polystyrene at a low load is as high as the aforementioned melting point, that at a high load is about the aforesaid glass transition temperature, that is, almost the same as the heat distortion temperature of the conventional general-purpose polystyrene (GPPS), restricting the application of above-mentioned syndiotactic polystyrene along with the unsatisfactory toughness and elongation thereof.

In order to improve the properties of the styrenic polymer having syndiotactic configuration there has been proposed a syndiotactic polystyrene compounded with other thermoplastic resin such as a general-purpose resin including polyolefin, an engineering plastic typified by polyamide and polycarbonate, etc. or an inorganic filler. However, there has been still some room for further improvement on the aforesaid syndiotactic polystyrene with respect to the interfacial adhesivity and compatibility and the poor compatibility with other resin as mentioned above has limited the improvement on the properties of such syndiotactic polystyrene.

In order to improve the compatibility of the above-mentioned syndiotactic polystyrene there has been developed as a compatibilyzing agent a polymer produced by modifying an atactic polystyrene with an unsaturated carboxylic acid (refer to Japanese Patent Application Laid-Open No. 219843/1990), a styrenic copolymer produced by copolymerization with a vinylic compound having an epoxy group, a styrenic copolymer produced by copolymerization with an α,β-unsaturated carboxylic acid anhydride (refer to Japanese Patent Application Laid-Open No. 209938/1990), and the like. However, the use of the polymer as mentioned above as a compatibilizing agent-has caused the problem of deteriorating the crystallizability of the composition which contains the above compatibilizing agent.

In addition, there has been known a styrenic copolymer comprising a styrenic repeating unit and maleimide repeating unit, in which the stereoregularity of the main chain of the styrenic repeating unit is mainly of syndiotactic configuration (refer to Japanese Patent Application Laid-Open No. 258805/1990). However, the aforementioned copolymer is insufficient in compatibility with the engineering plastics such as polyamide.

Under such circumstances there has been proposed a styrenic copolymer of styrenic repeating unit having syndiotactic configuration and a carboxylic acid or ester thereof for the purpose of improving the interfacial wettability with an inorganic filler while maintaining the heat resistance and chemical resistance of the foregoing polymers (refer to International Patent Application Laid-Open No. 78168/1989).

However, further improvement is desired for the above-proposed copolymer with regard to the interfacial adhesivity.

DISCLOSURE OF THE INVENTION

In view of the above-mentioned circumstances, intensive research was concentrated by the present inventors to solve the aforestated problems and to develop a styrenic copolymer further improved in interlabial adhesivity and excellent in compatibility with the above-stated other resin which copolymer can be produced in a high production efficiency as well as a process for producing the copolymer.

As a result, it has been found that a styrenic copolymer comprising an unsaturated carboxylic acid monomer or a derivative thereof each having a specific structure and a comonomer of a styrenic repeating unit, the stereoregularity of the main chain of which has a high degree of syndiotactic configuration is well suited for the foregoing purpose.

The present invention Has been accomplished on the basis of the above-stated finding and information.

Specifically the present invention provides a styrenic copolymer which comprises at least one structural unit (I) represented by the general formula (I)

wherein $R^1$ is a hydrogen atom, halogen atom exemplified by chlorine, bromine, fluorine and iodine or substituent having at least one member selected from carbon atom, tin atom and silicon atom; m is an integer from 1 to 5; and when m is a plural, $R^1$ may be the same or different, and a structural unit (II) represented by the general formula (II)

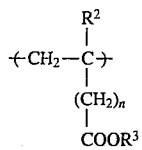
(II)

wherein $R^2$ is a hydrogen atom, halogen atom, cyano group or hydrocarbon residue having 1 to 20 carbon atoms; n is an integer from 0 to 20; $R^3$ is a substituent having at least one member selected from

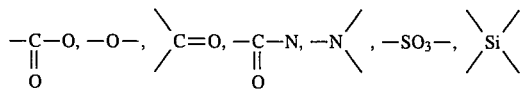

and a metal, or a hydrogen atom; and when $R^3$ is a hydrogen atom, n is an integer from 1 to 20, said styrenic copolymer being characterized in that the structural unit (II) is contained in an amount of 0.01 to 99.9 mol %, the intrinsic viscosity of the copolymer as measured in 1,2,4-trichlorobenzene at 135° C. ranges from 0.01 to 20 dl/g and the stereoregularity of the main chain of said structural unit (I) has a high degree of syndiotactic configuration.

The present invention also provides a process for producing the above-mentioned styrenic copolymer which comprises polymerizing a styrenic monomer represented by the general formula (III)

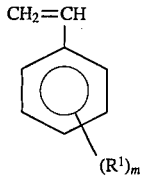
(III)

wherein $R^1$ and m are each as previously defined in the presence of a catalyst comprising a transition metal compound and an aluminoxane to substantially form a polymer and thereafter adding to the polymer a comonomer represented by the general formula (IV)

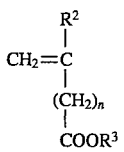
(IV)

wherein $R^2$ and $R^3$ are each as previously defined to proceed with copolymerization.

The present invention further provides a styrenic copolymer which comprises at least one structural unit (I) represented by the general formula (I)

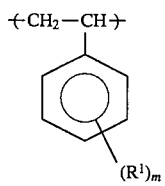
(I)

wherein $R^1$ and m are each as previously defined, and a structural unit (IX) represented by the general formula (IX)

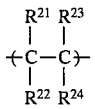
(IX)

wherein at least two of $R^{21}$ to $R^{24}$ are each a substituent represented by —$(CH_2)_n$—COOR wherein R is a hydrogen atom; a metal belonging to the group I, II, III, IVA or VIII in the Periodic Table; an alkyl group having 1 to 20 carbon atoms which may be non-substituted or substituted by a substituent selected from a halogen atom, an alkylthio group, acylthio group, arylthio group and a halogenoalkoxy group; an alkenyl group having 2 to 5 carbon atoms; an alkynyl group having 2 to 5 carbon atoms; an arylalkyl group having 7 to 20 carbon atoms; or an aryl group having 6 to 20 carbon atoms which may be non-substituted or substituted by a substituent selected from a halogen atom, hydroxyl group and an alkyl group having 1 to 20 carbon atoms, and n is an integer from 0 to 10 or two of $R^{21}$ to $R^{24}$ together form a formula (X)

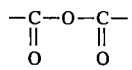
(X)

and the others of $R^{21}$ to $R^{24}$ are each a hydrogen atom, halogen atom; an alkyl group having 1 to 4 carbon atoms which may be non-substituted or substituted by a carboxyl group; an alkylthio group having 1 to 4 carbon atoms; alkoxy group having 1 to 4 carbon atoms; aryl group having 6 to 10 carbon atoms; aryloxy group having 6 to 10 carbon atoms; a nitro group or a trialkylsilyl group having 1 to 4 carbon atoms, said styrenic copolymer being characterized in that the structural unit (IX) is contained in an amount of 0.01 to 99.9 mol %, the intrinsic viscosity of the copolymer as measured in 1,2,4-trichlorobenzene at 135° C. ranges from 0.01 to 20 dl/g and the stereoregularity of the main chain of said structural unit (I) has a high degree of syndiotactic configuration.

The present invention still further provides a process for producing the above-mentioned styrenic copolymer which comprises polymerizing a styrenic monomer represented by the general formula (III)

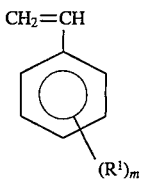
(III)

wherein $R^1$ and m are each as previously defined, in the presence of a catalyst comprising a transition metal compound and an alumioxane to substantially form a polymer and thereafter adding to the above-mentioned polymer a comonomer represented by the general formula (XI)

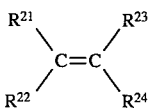
(XI)

wherein $R^{21}$ to $R^{24}$ are each as previously defined to proceed with copolymerization.

BRIEF DESCRIPTION OF THE DRAWINGS

FIG. 4 shows electron micrographs of the rupture cross-sections of the compositions obtained in the after-mentioned Example 24A, B.

FIG. 5 shows electron micrographs of the rupture cross-sections of the compositions obtained in the after-mentioned Example 24C and Comparative Example A.

FIG. 6 shows electron micrographs of the rupture cross-sections of the compositions obtained in the after-mentioned Comparative Examples B and C.

Figure 1:
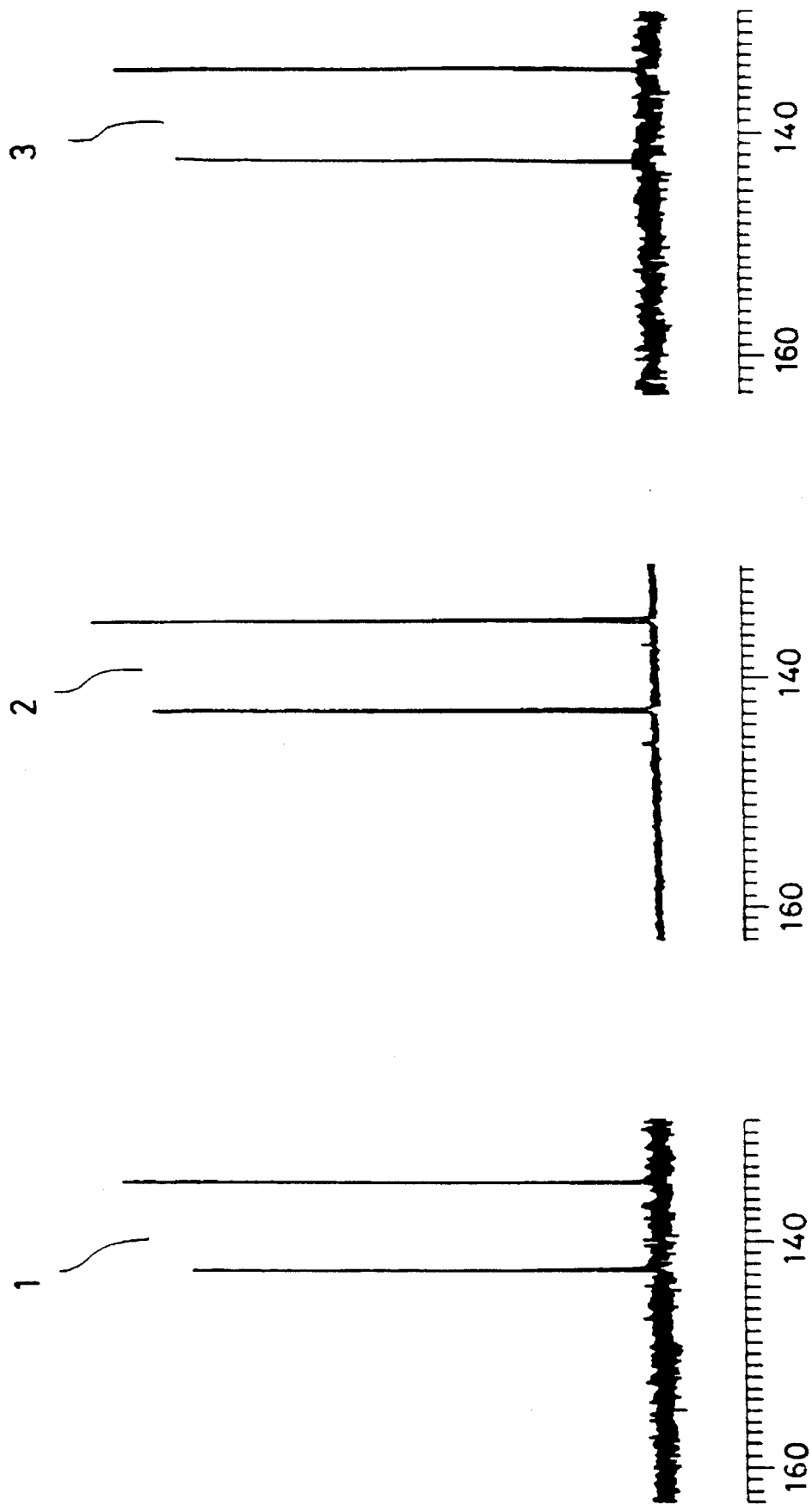
FIG. 1 shows $^{13}$C-NMR spectra for the whole polymer, sample A and sample B each obtained in the after-mentioned Example 23.

In the above figures, numeral 1 relates to $^{13}$C-NMR spectrum for the whole polymer; numeral 2 to $^{13}$C-NMR spectrum for sample A; numeral 3 to $^{13}$C-NMR spectrum for sample B; numeral 4 to IR spectrum for the syndiotactic poly(p-methylstyrene); numeral 5 to IR spectrum for the whole polymer; numeral 6 to IR spectrum for sample A; numeral 7 to IR spectrum for sample B; numeral 8 to molecular-weight distribution chart by GPC for sample B; numeral 9 to molecular-weight distribution chart by GPC for the whole polymer; numeral 10 to molecular-weight distribution chart by GPC for sample A; numeral 11 to the composition of Example 24A; numeral 12 to the composition of Example 24B; numeral 13 to the composition of Example 24C; numeral 14 to the composition of Comparative Example A; numeral 15 to the composition of Comparative Example B; and numeral 16 to the composition of Comparative Example C.

THE MOST PREFERRED EMBODIMENT TO CARRY OUT THE INVENTION

As described hereinbefore, the styrenic copolymer according to the present invention is roughly divided into the copolymer which comprises the repeating unit [structural unit (I)] represented by the general formula (I) and the repeating unit [structural unit (II)] represented by the general formula (II) (copolymer A); and the copolymer which comprises the repeating unit [structural unit (I)] represented by the general formula (I) and the repeating unit [structural unit (IX)] represented by the general formula (IX) (copolymer B).

The repeating unit (I) represented by the general formula (I) is derived from the styrenic monomer represented by the above-mentioned general formula (III), which is specifically exemplified by alkylstyrenes such as styrene, p-methylstyrene, o-methylstyrene, m-methylstyrene, 2,4-dimethylstyrene, 3,5-dimethylstyrene, 3,4-dimethylstyrene, 3,5-dimethylstyrene and p-tert-butylstyrene (preferably alkylstyrenes having an alkyl group of 1 to 10 carbon atoms); halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; vinylbiphenyls such as 4-vinylbiphenyl, 3-vinylbiphenyl and 2-vinylbiphenyl; vinylphenylnaphthalenes such as 1-(4-vinylphenyl)naphthalene, 2-(4-vinylphenyl)naphthalene, 1-(3-vinylphenyl)naphthalene, 2-(3-vinylphenyl)naphthalene, 1-(2-vinylphenyl)naphthalene and 2-(2-vinylphenyl)naphthalene; vinylphenylanthracenes such as 1-(4-vinylphenyl)anthracene, 2-(4-vinylphenyl)anthracene, 9-(4-vinylphenyl)anthracene, 1-(3-vinylphenyl)anthracene, 2-(3-vinylphenyl)anthracene, 9-(3-vinylphenyl)anthracene, 1-(2-vinylphenyl)anthracene, 2-(2-vinylphenyl)anthracene and 9-(2-vinylphenyl)anthracene; vinylphenylphenanthrene such as 1-(4-vinylphenyl)phenanthrene, 2-(4-vinylphenyl)phenanthrene, 3-(4-vinylphenyl)phenanthrene, 4-(4-vinylphenyl)phenanthrene, 9-(4-vinylphenyl)phenanthrene, 1-(3-vinylphenyl)phenanthrene, 2-(3-vinylphenyl)phenanthrene, 3-(3-vinylphenyl)phenanthrene, 4-(3-vinylphenyl)phenanthrene, 9-(3-vinylphenyl)phenanthrene, 1-(2-vinylphenyl)phenanthrene, 2-(2-vinylphenyl)phenanthrene, 3-(2-vinylphenyl)phenanthrene, 4-(2-vinylphenyl)phenanthrene and 9-(2-vinylphenyl)phenanthrene; vinylphenylpyrenes such as 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene and 2-(2-vinylphenyl)pyrene; vinylterphenyls such as 4-vinyl-p-terphenyl, 4-vinyl-m-terphenyl, 4-vinyl-o-terphenyl, 3-vinyl-p-terphenyl, 3-vinyl-m-terphenyl, 3-vinyl-o-terphenyl, 2-vinyl-p-terphenyl, 2-vinyl-m-terphenyl and 2-vinyl-o-terphenyl; vinylphenylterphenyls such as 4-(4-vinylphenyl)-p-terphenyl; vinylalkylbiphenyls such as 4-vinyl-4'-methylbiphenyl, 4-vinyl-3'-methylbiphenyl, 4-vinyl-2'-methylbiphenyl, 2-methyl-4-vinylbiphenyl and 3-methyl-4-vinylbiphenyl; halogenated vinylbiphenyls such as 4-vinyl-4'-fluorobiphenyl, 4-vinyl-3'-fluorobiphenyl, 4-vinyl-2'-fluorobiphenyl, 4-vinyl-2-fluorobiphenyl, 4-vinyl-3-fluorobiphenyl, 4-vinyl-4'-chlorobiphenyl, 4-vinyl-3'-chlorobiphenyl, 4-vinyl-2'-chlorobiphenyl, 4-vinyl-2-chlorobiphenyl, 4-vinyl-3-chlorobiphenyl, 4-vinyl-4'-bromobiphenyl, 4-vinyl-3'-bromobiphenyl, 4-vinyl-2'-bromobiphenyl, 4-vinyl-2-bromobiphenyl and 4-vinyl-3-bromobiphenyl; trialkylsilylvinylbiphenyls such as 4-vinyl-4'-trimethylsilylbiphenyl; trialkylstannylvinylbiphenyls such as 4-vinyl-4'-trimethylstannylbiphenyl and 4-vinyl-4'-tributylstannylbiphenyl; trialkylsilylmethylvinylbiphenyls such as 4-vinyl-4'-trimethylsilylmethylbiphenyl; trialkylstannylmethylvinylbiphenyls such as 4-vinyl-4'-trimethylstannylmethylbiphenyl and 4-vinyl-4'-tributylstannylmethylbiphenyl; halogen-substituted alkylstyrene such as p-chloroethylstyrene, m-chloroethylstyrene and o-chloroethylstyrene; alkylsilylstyrenes such as p-trimethylsilylstyrene, m-trimethylsilylstyrene, o-trimethylsilylstyrene, p-triethylsilylstyrene, m-triethylsilylstyrene, o-triethylsilylstyrene and p-dimethyl-tert-butylsilylstyrene; phenyl group-containing silylstyrenes such as p-dimethylphenylsilylstyrene, p-methyldiphenylsilylstyrene and p-triphenylsilylstyrene; halogen-containing silylstyrene such as p-dimethylchlorosilylstyrene, p-methyldichlorosilylstyrene, p-trichlorosilylstyrene, p-dimethylbromosilylstyrene and p-dimethyliodosilylstyrene; silyl group-containing silylstyrene such as p-(p-trimethylsilyl) dimethylsilylstyrene; and a mixture of at least two thereof.

In the repeating unit [structural unit (II)] represented by the general formula (II), $R^2$ is a hydrogen atom, halogen atom, cyano group or hydrocarbon residue having 1 to 20 carbon atoms, preferably hydrocarbon radical having 1 to 10 carbon atoms exemplified by saturated hydrocarbon radical, especially alkyl group such as methyl group, ethyl group, propyl group, butyl group, pentyl group and hexyl group, unsaturated hydrocarbon radical such as aryl group, aralkyl group, alkylaryl group and vinyl group and halogen substituted group thereof; $R^3$ is a substituent having at least one member selected from

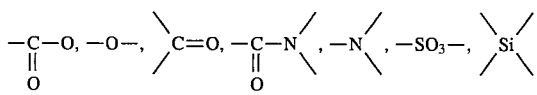

and a metal or a hydrogen atom; and when $R^3$ is a hydrogen atom, n is an integer from 1 to 20. Examples of the metal include alkali metal such as sodium and potassium; alkaline earth metal such as calcium and magnesium, tin, zinc, copper, cobalt and silver. The aforesaid metal may constitute an organometallic compound as well as a salt.

The repeating unit [structural unit (II)] represented by the general formula (II) is derived from the monomer represented by the general formula (IV). There are available a variety of such monomers, that is, unsaturated hydrocarbons each containing a heteroatom and specifically exemplified by tetrahydrofurfuryl methacrylate; 2-phenylmethyl acrylate; glycidyl acrylate; glycidyl methacrylate; tetrahydrofurfuryl acrylate; (3-ethyl-3-oxetanyl)methyl acrylate; tetrahydro-2H-pyran-2-yl acrylate; (tetrahydro-2-furanyl)methyl acrylate; 9-oxiranylnonyl acrylate; (3-methyloxiranyl)methyl acrylate; N-phenyl-N-ethylaminoethyl methacrylate; p-nitrophenyl methacrylate; diethylaminoethyl acrylate; diethylaminoethyl methacrylate; quaternary salt thereof; 2-cyanoethyl acrylate; 2-(butylethylamino)ethyl acrylate; morpholinoethyl methacrylate; 2-morpholinoethyl acrylate; 4-sulfophenyl acrylate sodium-salt; sodium acrylate; potassium acrylate; magnesium acrylate; calcium acrylate; sodium 10-undecenate; 10-undecenic acid; 4-sulfophenyl acrylate; β-ethoxyethyl acrylate; pheoxylethyl acrylate; pheoxydiethyl-ethyl acrylate; 2-benzoxyethyl acrylate; methacrylomethoxy trimellitate; 3-trimethoxysilylpropyl acrylate; and 3-trimethoxysilylpropyl acrylate.

With regard to the copolymer B, the repeating unit [structural unit (IX)] represented by the general formula (IX) is derived from the unsaturated hydrocarbon monomer containing a heteroatom represented by the above-mentioned general formula (XI), which monomer is characterized in that at least two of $R^{21}$ to $R^{24}$ in the formula have each a carboxyl group or a group derived therefrom or that the two carboxyl groups or the groups derived therefrom are subjected to dehydration condensation to form a ring together. Examples of such unsaturated hydrocarbon monomer having at least two carboxyl groups or the groups derived therefrom include maleic acid series, itaconic acid series, fumaric acid series, glutaconic acid series and as the monomer forming a ring represented by the formula (X), maleic anhydride series and itaconic anhydride series. The aforestated examples are specifically enumerated by, as maleic acid series, maleic acid, methylmaleic acid, dimethylmaleic acid, phenylmaleic acid, chloromaleic acid, dichloromaleic acid, fluoromaleic acid, difluoromaleic acid, bromomaleic acid, dimethyl maleate, diethyl maleate, diethyl methylmaleate, dipropyl maleate, diisopropyl maleate, dibutyl maleate, diisobutyl maleate, dipentyl maleate, diisopentyl meleate, dihexyl maleate, diheptyl maleate, dioctyl maleate, bis(2-ethylhexyl) maleate, dinonyl maleate, dihexadecyl maleate, dipropargyl maleate, bis[2-(2-chlroethoxy)ethyl] maleate, dibenzyl maleate, methylallyl maleate, methyl-2-butenyl maleate, methyl-3-butenyl maleate, allyl-3-methylthiopropyl maleate, allyl-3-ethylthiopropyl maleate, allyl-3-acetylthiopropyl maleate, allyl-3-phenylthiopropyl maleate, methyl-p-chlorophenyl maleate, butyl-p-chlorophenyl maleate, benzyl-p-chlophenyl maleate, diphenyl maleate, di-m-crezyl maleate, di-p-crezyl maleate, n-peptyl maleate, nonyl maleate, decyl maleate, dodecyl maleate, octadecyl maleate and fluoroalkyl maleate; as itaconic acid series, itaconic acid, diethyl itaconate and itaconic anhydride; as fumaric acid series, fumaric acid, diethyl fumarate, diphenyl fumarate, methylfumaric acid and diethyl methylfumarate; as maleic anhydride series, maleic anhydride, methylmaleic anhydride, dimethylmaleic anhydride, phenylmaleic anhydride, diphenylmaleic anhydride, chloromaleic anhydride, dichloromaleic anhydride, fluoromaleic anhydride, difluoromaleic anhydride, bromomaleic anhydride and dibromomaleic anhydride; as other monomer, cis-glutaconic acid, diethyl cis-glutaconate, trans-glutaconic acid and diethyl trans-glutaconate; and further a number of unsaturated hydrocarbon monomers each containing a metallic ion such as sodium maleate, calcium maleate and zinc fumarate, which monomer is obtained through ionization by reacting the ion of a metal belonging to the group I, II, III, IVA or VIII of the Periodic Table such as sodium, calcium, lithium, magnesium, zinc, tin, aluminum, copper and iron with the compound having a carboxyl group among the foregoing compounds.

With respect to the copolymer according to the present invention, the structural Unit (I) may comprise at least two components, and the same is true for the structural units (II) and (IX). Thus, the synthesis of a bipolymer, terpolymer or quadripolymer is made possible. As the repeating unit (IX) containing a metallic component, the corresponding monomer may be used as such, may be copolymerized by the use of a monomer containing a carboxylic acid unit followed by ionization by a compound containing a metal belonging to the group I, II, III, IVA or VIII of the Periodic Table, or may be copolymerized by the use of a monomer containing a carboxylic acid ester unit followed by hydrolysis, thermal cracking and ionization by a compound containing a metal belonging to the group I, II, III, IVA or VIII. The content of the above-mentioned structural unit (II) or (IX) may be suitably selected according to the composition of the objective copolymer and is usually 0.01 to 99.9 mol %, desirably 0.05 to 90 mol %, particularly desirably 0.1 to 60 mol % based on the whole copolymer. A content of the structural unit (II) or (IX) less than 0.01 mol % results in failure to sufficiently attain the objective effect on the improvement because of decrease in the compatibility with other type of resin due to, decrease in the interfacial adhesivity, whereas a content thereof exceeding 99.9 mol % inhibits crystallization, impairs the chemical resistance which characterizes the syndiotactic styrenic polymer and tends to cause coloring (bdrn) at the time of molding.

Regarding the molecular weight of the copolymer, the intrinsic viscosity thereof as measured in 1,2,4-trichlorobenzene at 135° C. is generally in the range of 0.01 to 20 dl/g, preferably 0.1 to 15 dl/g. An intrinsic viscosity of less than 0.01 dl/g results in a deteriorated dynamical properties, thus making it impossible to put the product into practical application, while an intrinsic viscosity exceeding 20 dl/g leads to difficulty in ordinary melt molding.

In addition, a third component other the aforestated structural unit may be added to the copolymer to the extent that the addition thereof does not considerably impair the properties of the copolymer to be obtained or the. syndiotactic configuration in the main chain of the structural unit (I). The compound as the third component is exemplified by diolefins, vinyl siloxanes, α-olefins, unsaturated carboxylic acid ester and acrylonitrile each other than the aforestated unsaturated hydrocarbon monomers.

The styrenic copolymer has a high degree of syndiotactic configuration in the main chain of the structural unit (I), that is, the styrenic repeating unit, which means that its stereochemical structure is of high degree of syndiotactic configuration, i.e. the stereostructure in which phenyl groups or substituted phenyl groups as side chains are located alternately at opposite directions relative to the main chain consisting of Carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrene copolymers having a high degree of syndiotactic configuration" as mentioned in the present invention usually means those having such a syndiotacticity that the proportion of racemic diad is at least 75%, preferably at least 85%, or the proportion of racemic pentad is at least 30%, preferably at least 50% each in the chain of the styrenic repeating units. However, the degree of syndiotacticity varies to some extent depending on the type of the constituent as well as the content of the structural unit (II) or (IX).

The copolymer of the present invention having a desired stereoregularity or reactive substituent can be produced by copolymerizing the monomers corresponding to the structural units (I) and (II), respectively in the case of copolymer A or the monomers corresponding to the structural units (I) and (IX), respectively in the case of copolymer B, or by applying fractionation, blending or, organic synthesis procedure by the use of the resultant copolymer as the raw material.

According to the process of the present invention there is obtained a styrenic poller having the above-mentioned structure and a high quality in a further enhanced efficiency.

The starting monomers to be used in the process according to the present invention include the styrenic monomer represented by the aforesaid general formula (III) and the monomer represented by the general formula (IV) in the case of producing the copolymer A, and in the case of producing the copolymer B they include the styrenic monomer represented by the aforementioned general formula (III) and the unsaturated hydrocarbon monomer containing a heteroatom represented by the general formula (XI). The above-mentioned styrenic monomer is copolymerized with the monomer represented by the general formula (IV) or (XI) to constitute the repeating units (I) and (II) and (IX). Consequently, the specific examples of the styrenic monomer and the monomer of the general formula (IV) or (XI) may include those corresponding to the specific examples of the foregoing repeating units (I) and (II) or (IX).

According to the process of the present invention, the styrenic monomer represented by the general formula (III) is at first polymerized in the presence of a catalyst comprising as principal ingredients (A) a transition metal compound and (B) an aluminoxane to substantially produce a polymer, that is, a styrenic polymer or oligomer having the structural unit (I) having a high degree of syndiotactic configuration in the main chain of the styrenic repeating unit.

Then, the styrenic polymer or oligomer thus obtained is copolymerized with the monomer of the general formula (IV) or (XI) to produce a copolymer. Various types of transition metal compounds are available as a component (A) of the catalyst, each being at least one compound preferably selected from the transition metal compounds represented by the general formula $$M^1R^4{}_aR^5{}_bR^6{}_cR^7{}_{4-(a+b+c)} \tag{V}$$

-continued $$M^2R^8{}_dR^9{}_eR^{10}{}_{3-(d+e)} \tag{VI}$$

$$M^3R^{11}{}_fR^{12}{}_{2-f} \parallel O \tag{VII}$$

or $$M^4R^{13}{}_gR^{14}{}_hR^{15}{}_{3-(g+h)} \parallel O \tag{VIII}$$

wherein $R^4$ to $R^{15}$ are each a hydrogen atom, halogen atom, alkyl group having 1 to 20 carbon atoms, alkoxyl group having 1 to 20 carbon atoms, aryl group having 6 to 20 carbon atoms, arylalkyl group having 7 to 20 carbon atoms, aryloxy group having 6 to 20 carbon atom is, acyloxy group having 1 to 20 carbon atoms, acetylacetonyl group, cyclopentadienyl group, substituted cyclopentadienyl group or indenyl group; a, b and c are each an integer from 0 to 4, satisfying the relation $0 \leq a+b+c \leq 4$; d and e are each an integer from 0 to 3, satisfying the relation $0 \leq d+e \leq 3$; f is an integer from 0 to 2, satisfying the relation $0 \leq f \leq 2$; g and h are each an integer from 0 to 3, satisfying the relation $0 \leq g+h \leq 3$; $M^1$ and $M^2$ are each a titanium atom, zirconium atom, hafnium atom or vanadium atom; and $M^3$ and $M^4$ are each a vanadium atom. Among the transition metal compounds as described above, those represented by the general formula (4) in which $M^1$ is a titanium atom or a zirconium atom are preferably used.

Among $R^4$ to $R^{15}$ represented by the foregoing formulae, specific examples of halogen atoms include chlorine atom, bromine atom, iodine atom and fluorine atom. Examples of the substituted cyclopentadienyl group include a cyclopentadienyl group replaced with at least one alkyl group having 1 to 6 carbon atoms, which is enumerated by methylcyclopentadienyl group, 1,2-dimethylcyclopentadienyl group, 1,3-dimethylcyclopentadienyl group, 1,3,4-trimethylcyclopentadienyl group, pentamethylcyclopentadienyl group, etc.

The symbols $R^4$ to $R^{15}$ in the above-mentioned formulae may be each independently a hydrogen atom; alkyl group having 1 to 20 carbon atoms exemplified by methyl group, ethyl group, propyl group, n-butyl group, isobutyl group, amyl group, isoamyl group, octal group and 2-ethyl-hexyl group; alkoxyl group having 1 to 20 carbon atoms exemplified by methoxy group, ethoxy group, propoxy group, butoxy group, amyloxy group, hexyloxy group, octyloxy group, 2-ethylhexyloxy group, etc.; aryl group having 6 to 20 carbon atoms exemplified by phenol group, naphthyl group, etc.; arylalkyl group having 6 to 20 carbon atoms exemplified by benzyl group, phenethyl group, 9-anthrylmethyl group; or acyloxy group having 1 to 20 carbon atoms exemplified by acetyloxy group, stearoyloxy group, etc., and may be the same or different from each other provided that the above-mentioned conditions are satisfied.

Among the transition metal compounds represented by any of the foregoing general formulae (V), (VI), (VII) and (VIII), specific examples of titanium compounds include tetramethoxytitanium, tetraethoxytitanium, tetra-n-butoxytitanium, tetraisopropoxytitanium, titanium tetrachloride, titanium trichloride, dichlorodiethoxytitanium, dichlorodiisopropoxytitanium, cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium tripheoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium tripheoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, and the like.

In the case where the styrenic monomer segment is required to have a higher molecular weight, the titanium compound in the form of alkoxide or having a substituted π electron type ligand is preferable, whereas in the case where the styrenic monomer segment is required to have a lower molecular weight, the titanium compound having a—electron type ligand such as substituted cyclopentadienyl group or halogen ligand is preferable.

Among the transition metal compounds represented by any of the above-mentioned general formulae (V), (VI), (VII) and (VIII), specific examples of zirconium compounds include cyclopentadienylzirconium trimethoxide, pentamethylcyclopentadienylzirconium trimethoxide, cyclopentadienyltribenzylzirconium, pentamethylcyclopentadienyltribenzylzirconium, bisindenylzirconium dichloride, dibenzylzirconium dichloride, tetrabenzylzirconium, tributoxyzirconium chloride, triisopropoxyzirconium chloride and the like.

Likewise, specific examples of hafnium compounds include cyclopentadienylhafnium trimethoxide, pentamethylcyclopentadienylhafnium trimethoxide, cyclopentadienyltribenzylhafnium, pentamethylcyclopentadienyltribenzylhafnium, bisindenylhafnium dichloride, dibenzylhafnium dichloride, tetrabenzylhafnium, tributoxyhafnium chloride, triisopropoxyhafnium chloride and the like.

In the same way, specific examples of vanadium compounds include vanadium trichloride, vanadyl trichloride, vanadium triacetylacetonato, vanadium tetrachloride, vanadium tributoxide, vanadyl dichloride, vanadyl bisacetylacetonato, vanadyl triacetylacetonato and the like.

On the other hand, the other component (B) of the catalyst is similar to the aluminoxane described for example, in Japanese Patent Application Laid-Open No. 187708/1987, and is a contact product of an organoaluminum compound and a condensation agent. In detail the organoaluminum compounds are usually those represented by the general formula $$AlR^{16}_3$$

wherein $R^{16}$ is an alkyl group having 1 to 20 carbon atoms, enumerated by trialkylaluminum such as trimethylaluminum, triethylaluminum and triisobutylaluminum. Among them, trimethylaluminum is most desirable.

As the condensation agent, mention may be made of water as a typical one and of arbitrary compounds which cause condensation reaction with the above-mentioned trialkylaluminum, exemplified by copper sulfate pentahydrate, adsorbed water by an inorganic or organic substance and the like.

Typical examples of the aluminoxane which constitutes the component (B) of the catalyst to be used in the present invention include the contact product of an trialkylaluminum represented by the general formula $AlR^{15}_3$ and water, which is more specifically a chain alkylaluminoxane represented by the general formula

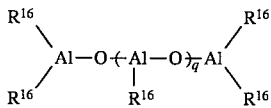

wherein $R^{16}$ stands for an alkyl group having 1 to 8 carbon atoms and q indicates degree of polymerization ranging from 0 to 50, atoms, or a cyclic aluminoxane having a repeating unit represented by the general formula

wherein $R^{16}$ is the same as above, and the number of repeating units ranges from 2 to 50. Among the above alkylaluminoxane is most desirable methylaluminoxane wherein $R^{16}$ is a methyl group.

In general, the contact product of an organic alkylaluminum compound such as trialkylaluminum and water includes the foregoing chain alkylaluminoxane and cyclic alkylaluminoxane together with unreacted trialkylaluminum, various mixtures of condensates and further the molecules resulting from association in an intricate manner thereof. Accordingly, the resultant contact product varies widely depending upon the conditions of contact of trialkylaluminum with water as the condensation agent.

The contacting method for the aluminum compound and water as a condensation agent is not specifically limited in the above case and may be effected according to the publicly known methods, which are exemplified by (1) a method in which an organoaluminum compound is dissolved in an organic solvent and then brought into contact with water, (2) a method in which an organoaluminum compound is at first added to the reaction system at the time of polymerization and thereafter water is added thereto, and (3) a method in which an organoaluminum compound is reacted with the water of crystallization contained in metal salts and the like, or the water adsorbed in inorganic or organic materials. The above-mentioned reaction proceeds even in the absence of a solvent but is preferably carried out in a solvent. Examples of the suitable solvent to be used here include aliphatic hydrocarbons such as hexane, heptane and decane, aromatic hydrocarbons such as benzene, toluene and xylene, and the like. The aforementioned water may contain up to about 20% of ammonia, amine such as ethylamine, sulfur compound such as hydrogen sulfide, phosphorus compound such as phosphite, or the like.

The aluminoxane exemplified by alkylaluminoxane which is used as the component (B) of the catalyst according to the present invention is preferably obtained by a method wherein the solid residue produced after contact reaction in the case of a water-containing compound being used is removed by means of filtration and the filtrate is heat treated under ordinary or reduced pressure at 30° to 200° C., preferably 40° to 150° C. for 20 minutes to 8 hours, preferably 30 minutes to 5 hours while distilling away the solvent used.

The temperature in the aforementioned heat treatment may be pertinently determined according to the various conditions, but should be Usually within the above-described range. A temperature lower than 30° C. fails to bring about the prescribed effect, whereas that exceeding 200° C. causes thermal decomposition of aluminoxane itself, each resulting in unfavorable consequence.

The reaction product is obtained in the form of colorless solid or solution depending upon the heat treatment conditions, and can be used as the catalyst solution by dissolving in or diluting with a hydrocarbon solvent according to the demand.

Suitable examples of the aluminoxane which is used as the component (B) of the catalyst, especially an alkylaluminoxane are those in which the area of the high magnetic field component in the methyl proton signal region due to the aluminum-methyl group (Al-CH$_3$) bond as observed by the proton nuclear magnetic resonance method is not more than 50% of the total signal area. That is, in a proton nuclear magnetic resonance ($^1$H-NMR) spectral analysis of the alkylaluminoxane in toluene solvent at room temperature, the methyl proton signal due to Al-CH$_3$ is observed in the region of 1.0 to −0.5 ppm (tetramethylsilane (TMS) standard). Since the proton signal of TMS (0 ppm) is in the region of the methyl proton signal due to Al-CH$_3$, the methyl proton signal due to Al-CH$_3$ is measured with 2.35 ppm methyl proton signal of toluene in TMS standard. The methyl proton signal due to Al-CH$_3$ is divided into two components: the high magnetic field component in the −0.1 to −0.5 ppm region and the other magnetic field component in the 1.0 to −0.1 ppm region. In alkylaluminoxane preferably used as component (B) of the catalyst in the present invention, the area of the high magnetic field component is not more than 50%, preferably 45 to 5% of the total signal area in the 1.0 to −0.5 ppm region.

The catalyst to be used in the process of the present invention comprises the above-mentioned components (A)-transition metal compound and (B)-aluminoxane as the primary ingredients, and if desired, in addition to the above two components, there may be added thereto other catalytic component such as trialkylaluminum compound represented by the general formula $$AlR^{17}_3$$

wherein $R^{17}$ as a plural is a halogen atom or an alkyl group having 1 to 8 carbon atoms and may be the same or different; and other organometallic compound.

Furthermore, inasmuch as the stereoregularity of the product is not impaired, the catalyst may be subjected to the addition of an organic compound having at least two hydroxyl groups, aldehyde groups of carboxyl groups, said compound being represented by the general formula (θ)

$$W\text{-}R^{18}\text{-}(Q)_r\text{-}R^{19}\text{-}W' \qquad (\theta)$$

wherein $R^{18}$ and $R^{19}$ are each a hydrocarbon radical having 1 to 20 carbon atoms, substituted aromatic hydrocarbon radical having 7 to 30 carbon atoms or substituted aromatic hydrocarbon radical having 6 to 40 carbon atoms and a substituent containing a heteroatom such as O, N or S; Q is a hydrocarbon radical having 1 to 20 carbon atoms,

—O—, —S—, —S—S—,

-continued

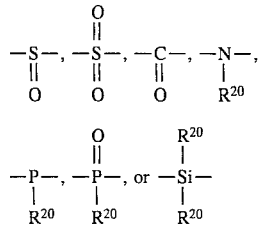

wherein $R^{20}$ is a hydrogen atom or hydrocarbon radical having 1 to 6 carbon atoms; W and W' are each a hydroxyl group, an aldehyde group or a carboxyl group; and r is an integer of 1 through 5.

Specific examples of the organic compound represented by the above-mentioned general formula include 2,2,'-dihydroxy-3,3'-di-tert-butyl-5,5'-dimethyldiphenyl sulfide, 2,2'-dihydroxy-3,3'-di-tert-butyl-5,5'-dimethylphenyl ether, etc.

In the case of using the organic compound represented by the general formula (e), the reaction product thereof with a transition metal compound is preferably employed. As the reaction condition, 0.1 to 10 mols of said organic compound is allowed to react with one (1) mol of the metal atom in said transition metal compound in the presence or absence of a solvent. As the usable solvent, there may be used a hydrocarbon solvent such as toluene and hexane or a polar solvent such as THF (tetrahydrofuran).

In the use of the above-described catalyst, the ratio of (A) transition metal compound to (B) aluminoxane varies from case to case with the type of each component, the type of the styrenic monomer represented by the general formula (III) as the starting raw material, the type of the monomer represented by the formula (IV) or (XI) and other conditions, and can not be unequivocally determined. As a general rule, however, the molar ratio of the aluminum in the component (B) to the titanium in the component (A), that is, aluminum titanium in molar ratio is 1 to $10^6$ preferably 10 to $10^4$.

The process according to the present invention comprises two steps wherein, in the polymerization step, the styrenic monomer represented by the general formula (III) is polymerized in the presence of the catalyst comprising the above-mentioned components (A) and (B) as principal ingredients to produce the styrenic polymer (including oligomer) and in the copolymerizing step, the styrenic polymer obtained in the preceding polymerization step is copolymerized with the monomer represented by the general formula (IV) or (XI) to produce the objective copolymer.

In the first polymerization step, the ratio of the styrenic monomer of the general formula (III) to the aluminoxane as a component of the catalyst is usually 1 to $10^6$, preferably 10 to $10^4$ in terms of styrenic monomer/aluminoxane molar ratio. In the second copolymerization step, the ratio of the styrenic monomer of the general formula (III) to the monomer of the general formula (IV) or (XI) may be arbitrarily selected according to the composition of the objective copolymer.

The polymerization temperature in the first polymerization step is not specifically limited, but should be selected in the range of usually 0° to 120° C., preferably 10° to 70° C. The polymerization time may be arbitrarily selected insofar as it is not shorter than the period of time required to substantially form the styrenic polymer (including oligomer), and is in the range of usually 5 seconds to 5 hours, preferably 200 seconds to 2 hours.

The copolymerization temperature in the second copolymerization step is not specifically limited, but should be selected in the range of usually −100° to 120° C., preferably −10° to 80° C. The copolymerization time varies depending upon the composition of the objective copolymer, and is in the range of usually 5 seconds to 24 hours, preferably 100 seconds to 10 hours.

The control of the composition of the copolymer to be produced can be carried out by suitably selecting the feed ratio of the styrenic monomer of the; general formula (III) to the monomer of the general formula (IV) or (XI), (co)polymerization temperature and time in the first and second steps and the like.

The polymerization and copolymerization may be carried out by any of various methods such as bulk, solution and suspension (co)polymerization. The usable solvents in the above (co)polymerization are exemplified by aliphatic hydrocarbons such as pentane, hexane and heptane, alicyclic hydrocarbons such as cyclohexane and aromatic hydrocarbons such as benzene, toluene and xylene. Among them are particularly desirable toluene, xylene and heptane. The monomer/solvent ratio by volume may be arbitrarily selected but is preferably 1 or less. The above-mentioned polymerization and copolymerization may be effected in the same or different polymerization method.

The control of the molecular weight of the styrenic copolymer to be produced can be effectively conducted in the presence of hydrogen.

The styrenic copolymer obtained by the process according to the present invention has a high degree of syndiotactic configuration in the main chain of the styrenic repeating unit. Moreover, the styrenic copolymer having an extremely high degree of syndiotacticity as well as a high purity can be obtained by subjecting as necessary the copolymer to deashing treatment with a cleaning solution containing hydrochloric acid or the like followed by cleaning and vacuum drying, and cleaning the copolymer with a solvent such as methyl ethyl ketone (MEK) to remove MEK-soluble portion.

The styrenic copolymer of the present invention is excellent in compatibility with engineering plastics such as polyamide and may be used in suitable combination with the compatible resin having a terminal functional group represented by the formula

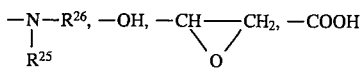

wherein $R^{25}$ and $R^{26}$ are each a hydrogen atom or a hydrocarbon radical having 1 to 20 carbon atoms. Specific examples of such resin include polyamide, polyacetal, polycarbonate, polysulfone, totally aromatic polyester, totally aromatic polyimide, polyamidimide, totally ,aromatic polyamide, polyetheretherketone, polyetherimide, poly(phenylene oxide) saturated aromatic polyester, poly(phenylene sulfide), polyarylate and polyurethane. The constitution percentage of the compatible resin is usually 0.01 to 600, preferably 5 to 300 parts by weight per 100 parts by weight of the styrenic copolymer.

Likewise, there are available a wide variety of fillers compatible with the above styrenic copolymer including inorganic fillers such as metallic oxide enumerated by titania, zirconia, silica, iron oxide, alumina, tin oxide, silica alumina and ferrite; metal enumerated by copper, aluminum, nickel, iron, tin, chrominum, silver and stainless steel; metal carbonate enumerated by calcium carbonate and barium carbonate; various ceramic materials enumerated by mica, carbon black, talc, clay, glass powder, glass fiber, glass bead, glass balloon, titanium white, carbon fiber, titanium boride, zirconium boride, tantalum boride, titanium silicide, tantalum silicide, molybdenum silicide, tungsten silicide, silicon carbide, chromium carbide, titanium carbide, zirconium carbide, boron carbide, diamond, boron nitride, silicon nitride, zirconium nitride, niobium nitride and titanium nitride; and organic fillers such as wood powder, cellulose and lignin.

The foregoing styrenic copolymer is incorporated with the aforesaid filler in the form of powder, granule, flake, whisker, fiber or the like. The compounding ratio of the filler is usually 0.01 to 200, preferably 0.5 to 100 parts by weight per 100 parts by weight of the total sum of the styrenic copolymer and the foregoing resin.

The method for mixing the resin and filler with the styrenic copolymer is not Specifically limited, but various method are available. Specific examples of the mixing method include the use of a kneading machine such as mixing roll, banbury mixer or kneader and uniaxial or biaxial extruder.

In the following, the present invention will be explained in more detail with reference to the examples.

EXAMPLE 1

(1) Preparation of methylaluminoxane

In a 500 ml glass vessel which had been purged with argon were placed 200 ml of toluene, 17.7 g (71 mmol) of copper sulfate pentahydrate ($CuSO_4 \cdot 5H_2O$) and 24 ml (250 mmol) of trimethylaluminum, which were then reacted at 40° C. for 8 hours. Then, the solids were separated from the reaction mixture and the toluene was distilled away from the solution as obtained above under reduced pressure to obtain 6.7 g of a contact product. The molecular weight thereof as determined by the freezing point depression method was 610. Further, when the area of the high magnetic field component by $^1$H-NMR spectral analysis, that is, the proton nuclear magnetic resonance spectral of the methylaluminoxane in toluene soluent at room temperature was observed, the methyl proton signal due to $Al-CH_3$ was observed in the region of 1.0 to −0.5 ppm (tetramethylsilane (TMS) standard). Since the proton signal of TMS (0 ppm) was in the region of methyl proton signal due to $Al-CH_3$, the methyl proton signal due to $Al-CH_3$ was measured with 2.35 ppm methyl proton signal of toluene in TMS, and the methyl proton signal due to $Al-CH_3$ was divided into two components. As the result, the high magnetic field component (i.e −0.1 to −0.5 ppm) was 43% of the total signal area.

(2) Production of copolymer

In a dried 100 ml reaction vessel were placed 20 ml of toluene, 2 mmol of methylaluminoxane obtained in the preceding (1) as the catalyst component and further 10 ml of p-methylstyrene at room temperature in an argon atmosphere and then the mixture was allowed to stand at 50° C. for 30 minutes.

Into the vessel was introduced 5 μmol of 1,2,3,4,5-pentamethylcyclopentadienyltitanium trimethoxide to initiate polymerization.

After polymerization reaction for 8 minutes, a solution of 10 mmol of glycidyl methacrylate in toluene (2 mol/liter) was added to the prepolymer to effect polymerization for one hour. Subsequently the reaction product was poured into a mixture of methanol and hydrochloric acid to arrest reaction, deashed, further washed with methanol and dried. The dried product was subjected to Soxhlet extraction by the use of MEK for 8 hours to remove amorphous polymer. The MEK-insoluble portion was dried to obtain 0.44 g of polymer, which had an intrinsic viscosity [η] of 3.8 dl/g. As a result of $^{13}$C-NMR analysis of the product, a sharp peak was observed at 142.8 ppm, showing that the main chain of p-methylstyrene is of syndiotactic configuration. Moreover as a result of IR analysis, the absorption of carbonyl group was observed at about 1730 cm$^{-1}$ proving that the content of glycidyl methacrylate unit as obtained by $^1$H-NMR analysis was 2.7 mol %. The results are given in Table 1. The syndiotacticity of the copolymer as determined by $^{13}$C-NMR analysis was not less than 95% in terms of racemic pentad.

EXAMPLE 2

The procedure in Example 1 was repeated except that the conditions of Example 2 in Table 1 was used in place of those of Example 1 to produce copolymer. The results are given in Table 1. The syndiotacticity of the copolymer as determined by $^{13}$C-NMR analysis was not less than 94% in terms of racemic pentad.

EXAMPLE 3

0.15 g of the copolymer obtained in Example 2 was dispersed in 10% aqueous solution of sodium hydroxide and reacted under boiling condition for 10 hours.

After the completion of the reaction, the product was filtered and washed with water, followed by drying with heating under reduced pressure. As a result of IR analysis for the copolymer, the absorbance at about 1720 cm$^{-1}$ assigned to —COOH dropped and a net absorption assigned to —COONa was confirmed at 1560 cm$^{-1}$. The degree of ionization obtained from the absorbance ratio between the above two was 92%. The results are given in Table 1. The syndiotacticity of the copolymer as determined by $^{13}$C-NMR analysis was not less than 94% in terms of racemic pentad.

EXAMPLE 4

The procedure in Example 1 was repeated except that the conditions of Example 4 in Table 1 was used in place of those of Example 1 to produce copolymer. The results are given in Table 1. The syndiotacticity of the copolymer as determined by $^{13}$C-NMR analysis was not less than 96% in terms of racemic pentad.

EXAMPLE 5

The procedure of Example 1 was repeated except that acrylic acid was used in place of glycidyl methacrylate to produce 0.52 g of copolymer, of which 0.15 g thereof was taken and reacted in the same manner as in Example 3. As the result, the degree of ionization was 89% and the content of sodium acrylate was 2.6 mol %. The results are given in Table 1. The syndiotacticity of the copolymer as determined by $^{13}$C-NMR analysis was not less than 94% in terms of racemic pentad.

EXAMPLES 6 TO 9

The procedure in Example 1 was repeated except that the conditions of Examples 6 to 9 in Table 1 was used in place of those of Example 1 to produce copolymers. The results are given in Table 1. The syndiotacticity of each of the copolymers as determined by $^{13}$C-NMR analysis was not less than 95% in terms of racemic pentad.

Comparative Example 1

The results of styrenic homopolymer are given in Table 1. The syndiotacticity of the polymer was not less 98% in terms of racemic pentad.

Comparative Example 2

In a dried 100 ml reaction vessel were placed 20 ml of toluene, 2 mmol of methylaluminoxane as obtained in the preceding (1) as the catalyst component and further 10 ml of styrene at room temperature in an argon atmosphere and then the mixture was allowed to stand at 50° C. for 30 minutes.

Into the vessel were introduced 5 µmol of 1,2,3,4,5-pentamethylcyclopentadienyltitanium trimethoxide and further, a solution of 10 mmol of methyl methacrylate in toluene (2 mol/liter) to effect polymerization for one hour. Subsequently the reaction product was poured into a mixture of methanol and hydrochloric acid to arrest reaction, deashed, further washed With methanol and dried to obtain 0.05 g of polymer having an intrinsic viscosity [η] of 0.48 dl/g. As a result of $^{13}$-NMR analysis of the product, a sharp peak was observed at 145.1 ppm, showing that the main chain of p-methylstyrene is of syndiotactic configuration. Moreover as a result of IR analysis, the absorption of carbonyl group was observed at about 1730 cm$^{-1}$ proving that the content of methyl methacrylate unit as obtained by $^1$H-NMR analysis was 2.0 mol %. The results are given in Table 1. The syndiotacticity of the copolymer as determined by $^{13}$C-NMR analysis was not less than 95% in terms of racemic pentad.

TABLE 1

| No. | Styrenic monomer | Heteroatom series unsaturated hydrocarbon | Styrene polymerization time (min) |
|---|---|---|---|
| Example 1 | p-methylstyrene | Glycidyl methacrylate | 6 |
| Example 2 | p-methylstyrene | 10-undecenoic acid | 6 |
| Example 3 | p-methylstyrene | Sodium 10-undecenoate | 6 |
| Example 4 | p-methylstyrene | 3-trimethoxysilylpropyl methacrylate | 6 |
| Example 5 | p-methylstyrene | Sodium acrylate | 6 |
| Example 6 | p-methylstyrene | Diethylaminoethyl methacrylate | 6 |
| Example 7 | Styrene | Glycidyl methacrylate | 8 |
| Example 8 | Styrene | 10-undecenoic acid | 8 |
| Example 9 | Styrene | Diethylaminoethyl methacrylate | 8 |
| Comparative Example 1 | Styrene | — | 30 |
| Comparative Example 2 | Styrene | Methyl methacrylate | 30 |

TABLE 1-continued

| No. | Extraction solvent | Yield (g) | Content of heteroatom-series unsaturated hydrocarbon (mol %) |
|---|---|---|---|
| Example 1 | Methyl ethyl ketone | 0.44 | 2.7 |
| Example 2 | Methyl ethyl ketone | 0.35 | 3.0 |
| Example 3 | — | — | 2.5 |
| Example 4 | Methyl ethyl ketone | 0.56 | 4.0 |
| Example 5 | — | — | 2.6 |
| Example 6 | Methyl ethyl ketone | 0.55 | 6.0 |
| Example 7 | Methylene chloride | 0.50 | 3.5 |
| Example 8 | Methylene chloride | 0.17 | 4.0 |
| Example 9 | Methylene chloride | 0.52 | 4.0 |
| Comparative Example 1 | Methyl ethyl ketone | 1.6 | — |
| Comparative Example 2 | — | 0.05 | 2.0 |

| No. | Melting point (°C.) | $(\eta)$ (dl/g) | $^{13}$C-NMR (ppm) | Adhesive strength (kg/15 × 15 mm) |
|---|---|---|---|---|
| Example 1 | — | 3.8 | 142.4 | 15.0 |
| Example 2 | — | 3.0 | 142.4 | 13.5 |
| Example 3 | — | 2.0 | 142.4 | 13.0 |
| Example 4 | — | 3.5 | 142.4 | 6.9 |
| Example 5 | — | 2.6 | 142.4 | 9.5 |
| Example 6 | — | 2.6 | 142.4 | 11.0 |
| Example 7 | 271 | 3.8 | 145.2 | 14.8 |
| Example 8 | 268 | 3.6 | 145.2 | 11.8 |
| Example 9 | 269 | 3.7 | 145.2 | 13.0 |
| Comparative Example 1 | 269 | 3.6 | 145.2 | ~0 |
| Comparative Example 2 | 267 | 0.48 | 145.1 | 3.2 |

$(\eta)$: Intrinsic viscosity

EXAMPLE 10

(1) Synthesis of titanium Catalyst component

A complex (A) of the formula

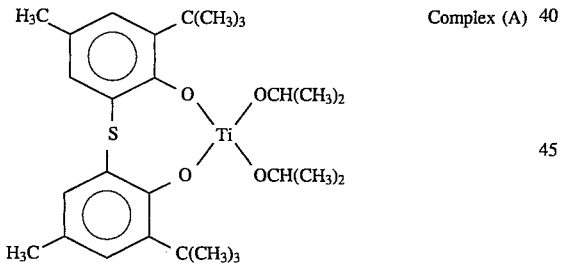

Complex (A)

was synthesized according to the method described in Polymer Preprints, Japan Vol. 36, 1415(1987) and made into a solution thereof in toluene (10 mmol/liter).

(2) The procedure in Example 1 (2) was repeated except that the above complex (A) was used as the titanium catalyst component to produce copolymer. The results are given in Table 2. The syndiotacticity of the copolymer as determined by $^{13}$C-NMR analysis was net less than 93% in terms of racemic pentad.

EXAMPLES 11 AND 12

The procedure in Example 10 (2) was repeated except that tetraethoxytitanium or titanium tetrachloride was used as the titanium catalyst component to produce copolymer. The results are given in Table 2. The syndiotacticity of the copolymer as determined by $^{13}$C-NMR analysis was not less than 94% in terms of racemic pentad.

TABLE 2

| No. | Titanium catalyst | Styrene polymerization time (min) | Yield (g) | Content of glycidyl methacrylate (mol %) |
|---|---|---|---|---|
| Example 10 | Complex (A) | 30 | 0.40 | 2.5 |
| Example 11 | Tetraethoxytitanium | 30 | 0.12 | 3.6 |
| Example 12 | TiCl$_4$ | 30 | 0.40 | 3.2 |

TABLE 2-continued

| No. | Melting point (°C.) | (η) (dl/g) | $^{13}$C-NMR (ppm) | Adhesive strength (kg/15 × 15 mm) |
|---|---|---|---|---|
| Example 10 | 270 | 2.2 | 145.2 | 14.2 |
| Example 11 | 270 | 1.2 | 145.2 | 15.1 |
| Example 12 | 269 | 1.3 | 145.2 | 13.1 |

(η): Intrinsic viscosity

EXAMPLE 13

(1) Methylaluminoxane

That prepared in Example 1 wets used.

(2) Production of copolymer

In a dried 100 ml reaction vessel were placed 20 ml of toluene, 2 mmol of methylaluminoxane obtained in the preceding (1) as the catalyst component and further 10 ml of styrene at room temperature in an argon atmosphere and then the mixture was allowed to stand at 50° C. for 30 minutes.

Into the vessel was introduced 5 μmol of 1,2,3,4,5-pentamethylcyclopentadienyltitnaium trimethoxide to initiate polymerization.

After polymerization reaction for 8 minutes, a solution of 10 mmol of maleic anhydride in toluene (2 mol/liter) was added to the prepolymer to effect polymerization for one hour. Subsequently the reaction product was poured into a mixture of methanol and hydrochloric acid to arrest reaction, deashed, further washed with methanol and dried. The dried product was subjected to Soxhlet extraction by the use of MEK for 8 hours to remove amorphous polymer. The MEK-insoluble portion was dried to obtain 0.39 g of polymer, which had an intrinsic viscosity [η] of 2.8 dl/g. The melting point (Tm) as determined by DSC was 269° C. As a result of $^{13}$C-NMR analysis of the product, a sharp peak was observed at 145.2 ppm, showing that the main chain of styrene is of syndiotactic configuration. Moreover as a result of IR analysis, the absorption of carbonyl group was observed at about 1730 cm$^{-1}$ and the content of maleic anhydried unit as obtained by $^1$H-NMR analysis was 1.4 mol %, The results are given in Table 3.

EXAMPLES 14 TO 17

Copolymerization reactions were carried out according to the reaction conditions given in Table 3 by the use of the heteroatom-series unsaturated hydrocarbons given in Table 3. The results are given in Table 3.

EXAMPLE 18

0.15 g of the copolymer obtained in Example 13 was mixed with 6.7 g of sodium hydroxide, 50 ml of methanol and 3 ml of demineralized water and the mixture was reacted at the boiling point for 20 hours, hydrolyzed and ionized to produce a dispersion. A portion of the dispersion was taken out and filtered, and the filtered cake was brought into contact with excess aqueous solution of hydrochloric acid, washed with water and dried.

The IR analysis of the copolymer indicated absorptions assigned to —COOH at 1720 to 1740 cm$^{-1}$, proving that the copolymer was styrene/maleic anhydride copolymer. Moreover the remaining dispersion was filtered, and the cake obtained was thoroughly washed with water and dried. The IR analysis of the copolymer showed absorption assigned to —COONa at 1560 cm$^{-1}$, proving that the copolymer was the copolymer of styrene and sodium salt of maleic anhydride.

EXAMPLE 19

Each of the copolymers obtained in Examples 16 and 17 was hydrolyzed and ionized under the conditions described in Example 18. As the results, there were obtained styrene/itaconic acid copolymer (IR; —COOH, 1720 cm$^{-1}$) and styrene/sodium itaconate copolymer (IR; —COONa, 1560 cm$^{-1}$), both from Example 16, styrene/fumaric acid copolymer (IR; —COOH, 1720 cm$^{-1}$) and styrene/sodium fuma-

TABLE 3

| No. | Heteroatom-series unsaturated hydrocarbon | Styrene polymerization time (min) | Extraction solvent | Yield (g) |
|---|---|---|---|---|
| Example 13 | Maleic anhydride | 8 | MEK*$^1$ | 0.39 |
| Example 14 | Diethyl maleate | 8 | MEK | 0.46 |
| Example 15 | Di-n-octyl maleate | 7.5 | MEK | 0.37 |
| Example 16 | Dimethyl itaconate | 7.5 | MEK | 0.35 |
| Example 17 | Diethyl fumarate | 8 | Methylene chloride | 0.17 |

| No. | Content of heteroatom*$^2$ (mol %) | Melting point (°C.) | (η) (dl/g) | $^{13}$C-NMR (ppm) | Syndiotacticity*$^3$ |
|---|---|---|---|---|---|
| Example 13 | 1.4 | 269 | 2.8 | 145.2 | 96 |
| Example 14 | 1.1 | 269 | 2.9 | 145.2 | 97 |
| Example 15 | 0.7 | 268 | 3.1 | 145.2 | 97 |
| Example 16 | 0.7 | 267 | 2.7 | 145.2 | 97 |
| Example 17 | 1.3 | 271 | 3.0 | 145.2 | 97 |

*$^1$methyl ethyl ketone
*$^2$Heteroatom-series unsaturated hydrocarbon
*$^3$Racemic pentad
(η): Intrinsic viscosity rate copolymer (IR; —COONa, 1560 cm$^{-1}$), both from Example 17.

EXAMPLE 20

(1) Titanium catalyst component

There was used the catalyst synthesized in Example 10.

(2) Production of copolymer

The procedure in Example 13 (2) was repeated except that the complex (A) in Example 10 (1) was used as the catalyst component to produce a copolymer. The results are given in Table 4.

EXAMPLES 21 AND 22

The procedure in Example 20 (2) was repeated except that tetraethoxytitanium was used in Example 21 and titanium tetrachloride was used in Example 22 to produce copolymers. The results are given in Table 4.

TABLE 4

| No. | Titanium catalyst | Styrene polymerization time (min) | Yield (g) | Content of maleic anhydride (mol %) |
|---|---|---|---|---|
| Example 20 | Complex (A) | 30 | 0.36 | 1.6 |
| Example 21 | TET | 30 | 0.10 | 2.1 |
| Example 22 | TiCl$_4$ | 30 | 0.42 | 1.8 |

| No. | Melting point (°C.) | (η) (dl/g) | $^{13}$C-NMR (ppm) | Syndiotacticity*[1] |
|---|---|---|---|---|
| Example 1 | 269 | 2.2 | 145.2 | 95 |
| Example 2 | 269 | 3.2 | 145.2 | 97 |
| Example 3 | 270 | 1.7 | 145.2 | 96 |

TET: Tetraethoxytitanium
*[1]Racemic pentad
(η): Intrinsic viscosity

EXAMPLE 23

(1) Production of p-methylstyrene/maleic anhydride copolymer

In a 500 ml three necked round bottom flask which had been dried and purged with nitrogen were placed 200 ml of toluene, 20 ml of p-methylstyrene, and after heating to 70° C., 40 mmol of methylaluminoxane prepared in Example 1 (1) and 100 μmol of 1,2,3,4,5-pentamethylcyclopentadienyltitanium methoxide to initiate polymerization. After an elapse of 4 minutes and 30 seconds, a solution of 49 mmol of maleic anhydride in toluene in a volume of 70 ml was added dropwise to the above mixture over a period of 17 minutes. Thus, polymerization reaction was effected for further one (1) hour, and then the product was poured in a large amount of methanol to arrest reaction, deashed, cleaned and dried to afford 10.6 g of copolymer, which had an intrinsic viscosity [η] of 2.1 dl/g.

(2) Identification of copolymer by column fractionation 7.36 g of copolymer (whole polymer) obtained in Example 23 (1) was dissolved in 40 to 50 ml of methylene chloride and fractionated in a column of 3 cm in diameter and 80 cm in length packed with silica. Firstly, a fraction of the copolymer was observed with a developer of 50:50 by volume of chloroform and hexane, and 150 ml of the fraction between 1200 m and 1350 ml was dispensed as sample A.

The development was continued until the end of the copolymer fractionation, and then chloroform/hexane ratio by volume in the developer was changed from 50:50 to 100:0 to resume development. Likewise, after the fractionation of the copolymer, 150 ml of the fraction between 1100 ml and 1250 ml was dispensed as sample B.

The recovered amount of the polymer excluding the above-mentioned samples A and B was 4.2 g with a recovery rate by development of 59.1%. The results of identification for samples A and B are given in Table 5.

Figure 2:
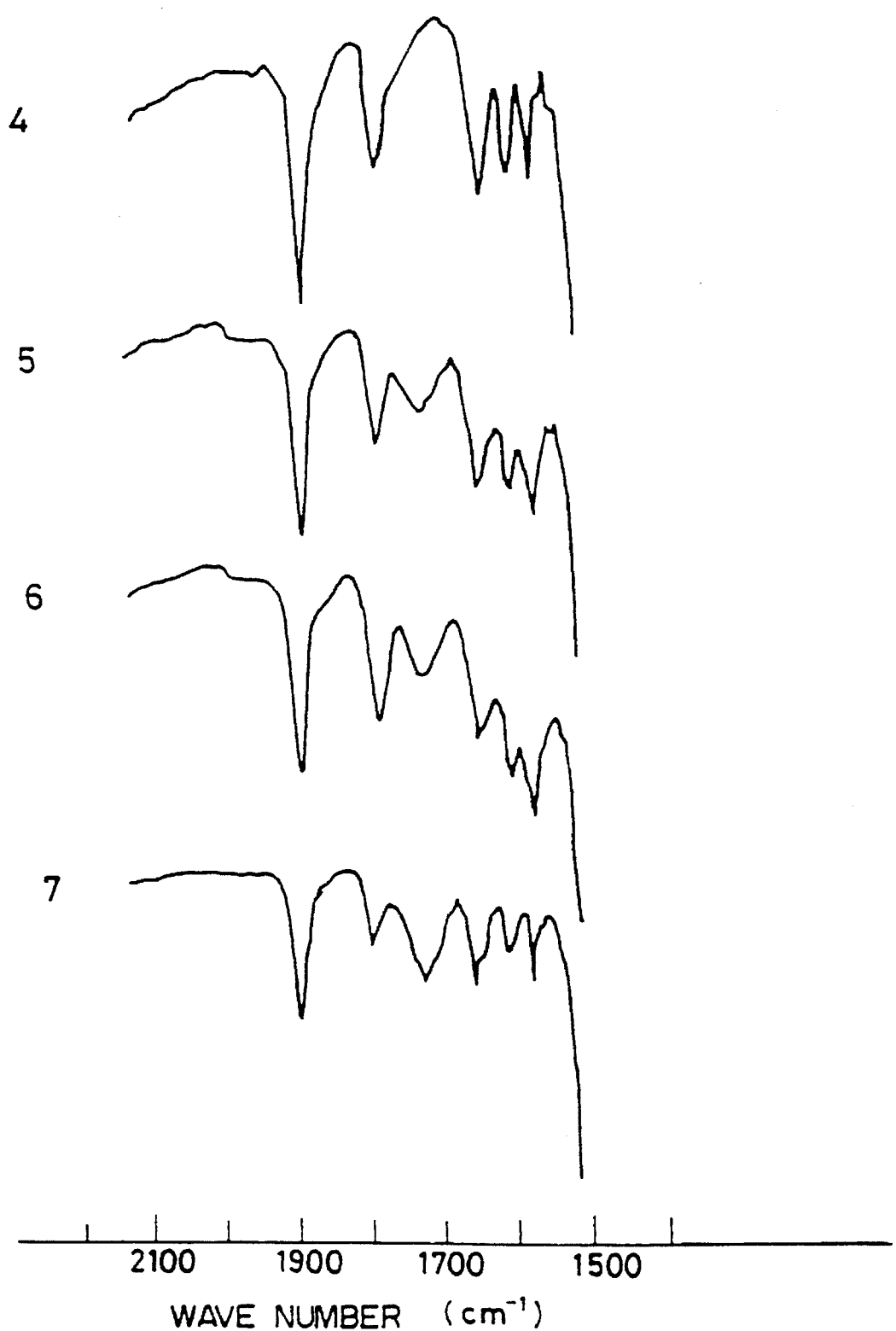
FIG. 2 shows IR spectra for the whole polymer, sample A and sample B each obtained in the after-mentioned Example 23.
Figure 3:
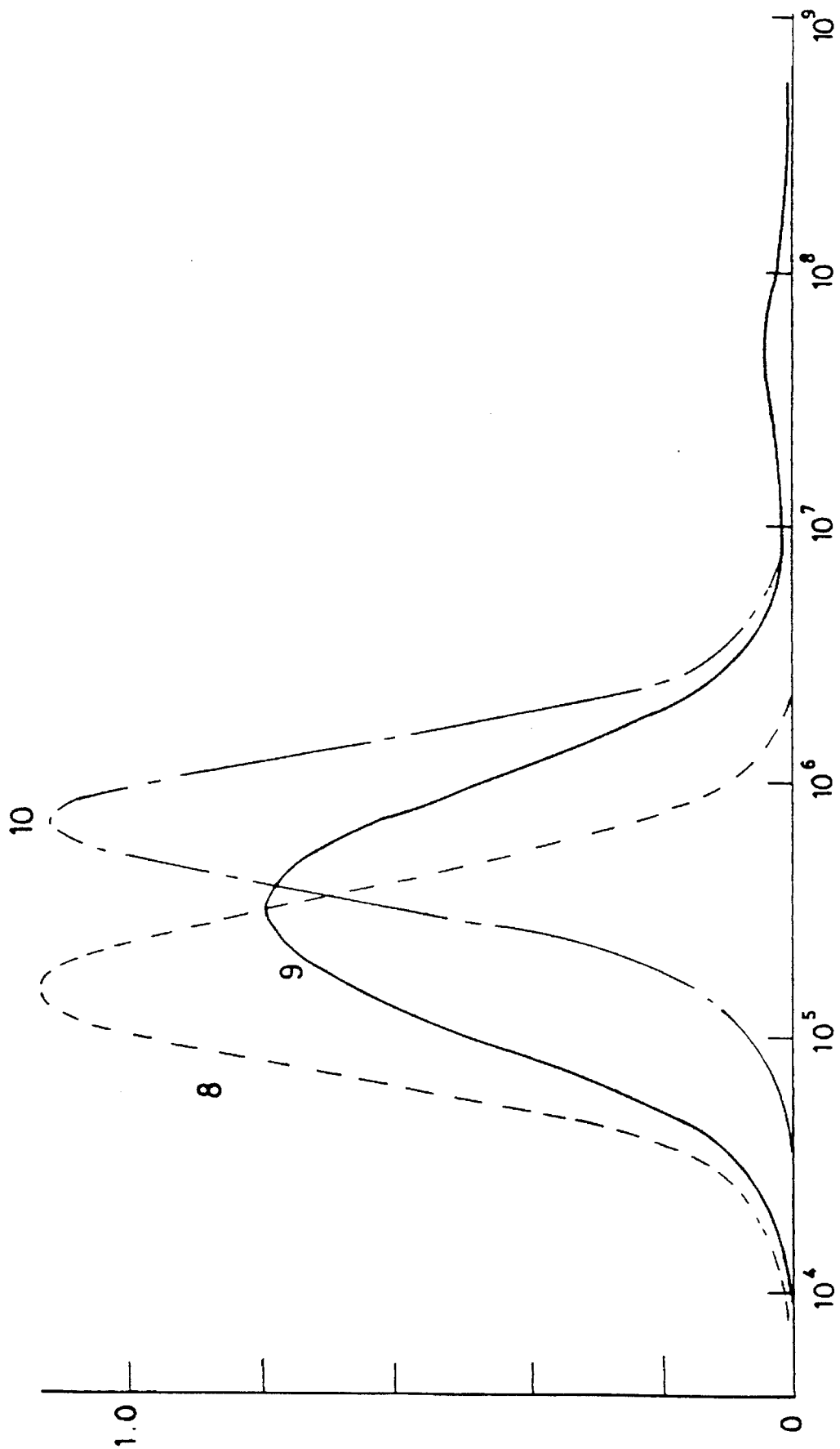
FIG. 3 shows molecular-weight distribution charts by GPC for the whole polymer, sample A and sample B each obtained in the after-mentioned Example 23.
Figure 7:
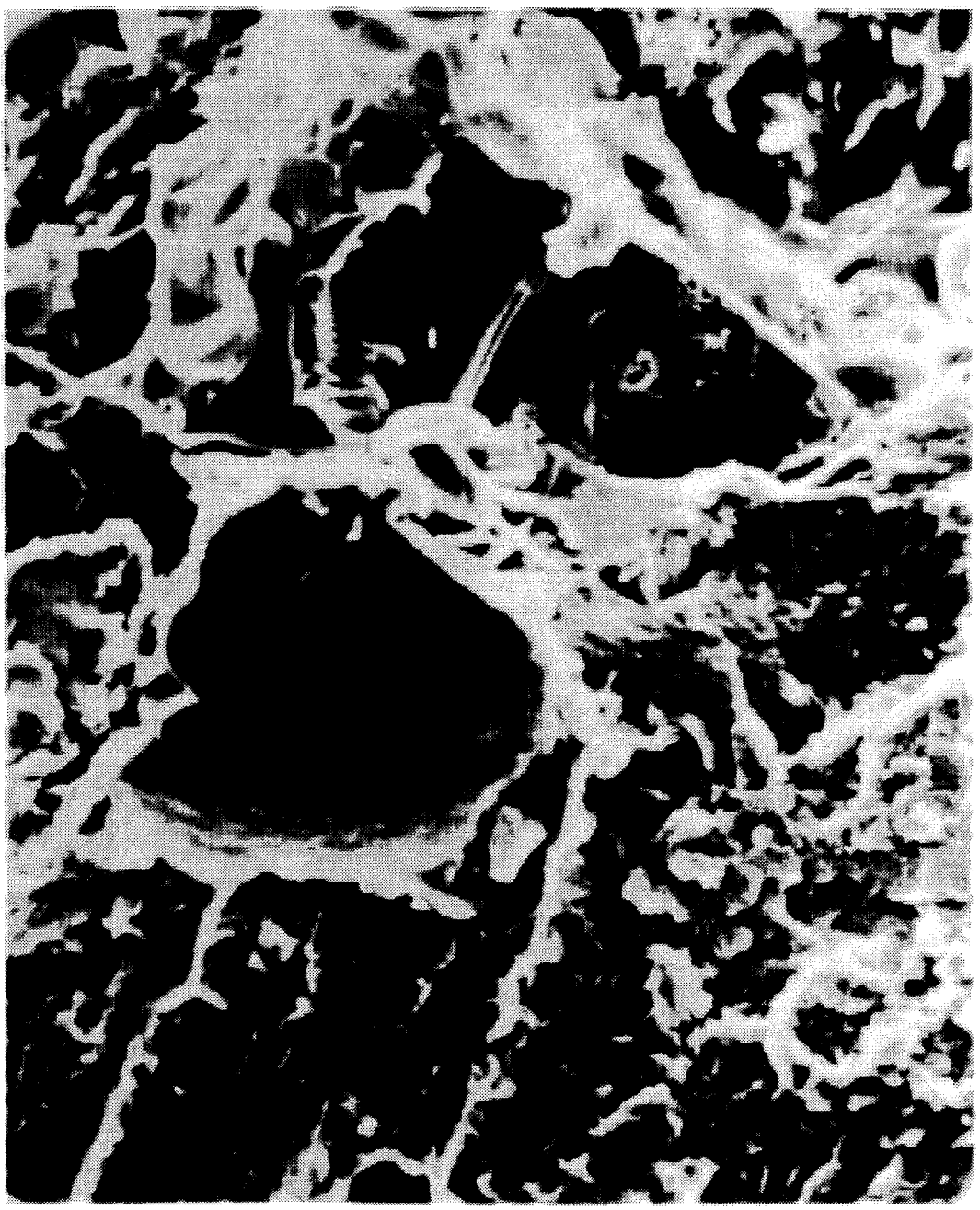
FIG. 7 shows an electron micrograph of the rupture cross-section of the composition obtained in the after-mentioned Comparative Example 3.

FIG. 1 shows $^{13}$C-NMR spectra for the whole polymer, sample A and sample B each obtain in Example 23. FIG. 2 shows IR spectra for the Whole polymer, sample A, sample B and for the purpose of comparison, syndiotactic p-methylstyrene. FIG. 3 shows molecular-weight distribution charts by GPC for the whole polymer, sample A and sample B.

It is recognized from FIG. 1 that the main chain of p-methyl has a high degree of syndiotactic configuration, from FIG. 2 that an absorption assigned to maleic acid unit is observed at about 1720 cm$^{-1}$ and from FIG. 3 that fractionated samples A and B have each a narrow molecular-weight distribution as compared with the whole polymer. It has been confirmed by the above-stated results that the polymer thus obtained is a copolymer.

TABLE 5

| Fraction | Yield (g) | Mw | Mw/Mn | Content of maleic anhydride (mol %) |
|---|---|---|---|---|
| Sample A | 0.081 | 223000 | 1.7 | 0.8 |
| Sample B | 0.070 | 874000 | 1.9 | 1.5 |
| Whole polymer | — | 562000 | 34.0 | 0.7 |

EXAMPLE 24

(1) production of maleic anhydride/styrene block copolymer

Into a dried 4 liter stainless steel-made autoclave were introduced 630 ml of toluene, 1.2 liter of styrene, 24 mmol of triisobutylaluminum and 24 mmol of methylaluminoxane which was prepared in Example at 70° C. with stirring for 30 minutes. To the resultant mixture was added 120 μmol of 1,2,3,4,5-pentamethylcyclopentadienyl titanium trimethoxide to initiate polymerization. After an elapse of 50 minutes, a solution of 260 mmol of maleic anhydride in 360 ml of toluene was added to the mixture to continue polymerization for 60 minutes. After the completion of the reaction, the resultant polymer was taken out from the autoclave, deashed with a mixed solution of hydrochloric acid and methanol, washed with methanol for the purification thereof and dried to afford 570 g of copolymer.

As the result of analysis for the copolymer, IR analysis showed an absorption assigned to maleic anhydride unit at 1780 $cm^{-1}$, $^1$H-NMR analysis gave a content of maleic anhydride of 1.5 mol %, $^{13}$C-NMR analysis showed an absorption assigned to $C_1$ carbon at 145.2 ppm and thermal analysis gave a melting point of 269.5° C. It was elucidated by the aforestated analysis results that the copolymer thus obtained was syndiotactic polystyrene/maleic anhydride block copolymer. The copolymer had a syndiotacticity of 97% in terms of racemic pentad and an intrinsic viscosity [η] of 2.3 dl/g.

(2) Production of composition

In a 100 ml laboratory blast mill manufactured by Toyo Seiki Co., Ltd. was melt kneaded the above-obtained copolymer (maleic anhydride/styrene block copolymer) with one of the various resins in a compounding ratio given in Table 6 at 280° C. and 50 r.p.m. for 8 minutes.

The electron micrographs of the rupture cross-sections for the kneaded compositions thus obtained are shown in the figures along with those of compositions of Comparative Examples A, B and C (refer to the numerals 11 through 16 in the figures). In each of the above Comparative Examples A, B and C, the composition was prepared under the same kneading conditions as in Example 24 (2) and Table 6 by the use of the syndiotactic polystyrene (SPS) that was prepared in the same manner as in Example 24 (1) except that maleic anhydride was not added thereto.

According to the electron micrographs magnifying the sections, every block copolymer of maleic anhydride and styrene exhibits favorable blending condition as compared with SPS without maleic anhydride. In addition, Table 7 gives the crystallinity and dispersed particle size for each of the example and comparative example.

Comparative Example 3

(1) Production of copolymer

The procedure in Example 24 (1) was repeated to produce a copolymer except that N-phenylmaleimide was used in place of maleic anhydride. The copolymer was obtained in a yield of 520 g. The content of N-phenylmaleimide was 1.9 mol %, which was determined from the calibration curve prepared by varying the mixing ratio of poly(N-phenylmaleimide) synthesized by radical polymerization to syndiotactic polystyrene, that is, from the ratio of absorbance at 1704 $cm^{-1}$ to absorbance at 1605 cm in IR analysis. As a result of $^{13}$C-NMR analysis, a sharp absorption assigned to $C_1$ carbon was observed at 145.2 ppm, proving that the aforementioned copolymer had syndiotactic configuration in the styrenic chain.

(2) Production of composition

The copolymer obtained in the preceding (1) in an amount of 42 g and 42 g of nylon 6,6 [2020B, produced by Ube Industries, Ltd.] was melt kneaded in the same manner as in Example 24 (2).

The composition thus obtained was subjected to severe surface-rougheing and marked brittleness. In FIG. 5 is shown an electron micrograph magnifying the rupture cross-section of the keaded composition thus obtained. According to the above-mentioned electron micrographs, every block copolymer of maleic anhydride and styrene exhibits favorable blending condition as compared with SPS without maleic anhydride. In addition, Table 7 gives the crystallinity and dispersed particle size for each of the example and comparative example.

TABLE 6

| | Composition | | | | |
|---|---|---|---|---|---|
| | | | Resin | | Glass |
| No. | SPS-MAn (g) | SPS (g) | Type | Amount (g) | fiber (g) |
| Example 24 A | 42 | — | Nylon 6,6 | 42 | — |
| Example 24 B | 42 | — | PET | 42 | — |
| Example 24 C | 51 | — | Nylon 6,6 | 17 | 17 |
| Comparative Example A | — | 42 | Nylon 6,6 | 42 | — |
| Comparative Example B | — | 42 | PET | 42 | — |
| Comparative Example C | — | 51 | Nylon 6,6 | 17 | 17 |

SPS MAn: Maleic anhydride-styrene block copolymer
Nylon 6,6: 2020B, produced by Ube Industries, Ltd.
PET: MA-560-B, produced by Mitsubishi Rayon Co., Ltd.
Glass fiber: Chopped strand, produced by Nitto Boseki Co., Ltd.

TABLE 7

| No. | Crystallinity*[1] (J/g) | Size of dispersed phase*[2] (mμ) |
|---|---|---|
| Example 24 A | 25.6 | Homogeneous phase |
| Example 24 B | 28.7*[3] | Homogeneous phase |
| Example 24 C | 28.6 | Homogeneous phase |
| Comparative Example A | 27.2 | 15–50 |
| Comparative Example B | 28.6 | 3–30 |
| Comparative Example C | 28.8*[3] | 1–20 |
| Comparative Example 3 | 23.2 | 10–40 |

*[1]Calculated from the melting peak during second heating with differential scanning calorimeter.
*[2]Judged with electron micrograph.
*[3]Value for resin matrix freed of glass fiber.

The following conditions were applied to the measurement of melting point, intrinsic viscosity, IR, NMR and GPC each for the copolymer.

[Melting point]

Apparatus: differential scanning calorimeter, model DSC-200 produced by Seiko Electronics Co., Ltd.
Measuring condition: (1) maintained at 300° C. for 5 min; (2) cooled to 30° C. at 7° C./min (first cooling); (3) maintained at 30° C. for 5 min; and (4) heated to 300° C. at 20° C./min (second heating). A melting point was determined during the second heating.

[Intrinsic viscosity]

Apparatus: Automatic viscometer produced by Rigo Co., Ltd. Measurement was made in 1,2,4-trichlorobenzene at 135° C.

[Adhesive Strength]

The copolymer or homopolymer each in an amount of 40 mg was inserted between two aluminum sheets each having 15 mm width and 50 μm thickness, molten at 340° C. over a period of 2 hours and subjected to press-forming under a pressure of 10 kg/cm² for 2 minutes. The test piece thus prepared was measured for adhesive strength at a rate of pulling of 2 cm/min.

[Infrared absorption spectrum (IR)]

KBr method was applied to the measurement.

[$^1$H-NMR]

Measurement was made in a mixed solvent of 1,2,4-trichlorobenzene and deuterated chloroform (ratio by volume of 50/50).

[$^{13}$C-NMR]

Measurement was made in a mixed solvent of 1,2,4-trichlorobenzene and deuterated chloroform (ratio by volume of 50/50).

[GPC]

Apparatus: Waters, ALS/GPC

Measurement was made in chloroform as the solvent at room temperature.

INDUSTRIAL APPLICABILITY

As described hereinbefore, having a high degree of syndiotactic configuration, the styrenic copolymer of the present invention is markedly improved in compatibility, adhesivity and wettability without being deteriorated in crystallinity while preserving its own heat and chemical resistances and is characterized by compatibility with other type of resin.

Accordingly, the styrenic copolymer of the present invention is easily complexed with glass fiber, talc, metal or the like, enabling the syndiotactic styrenic resin to be applied to and develop into a variety of composite materials. Moreover, the styrenic copolymer of the present invention is utilized not only as a molding material by virtue of its favorable workability in molding but also as a blending material for an other material to be molded for improving the physical properties of the other material.

By reason of the above-described characteristics, the styrenic copolymer of the present invention is effectively employed as a wide variety of structural materials, compatibilizer or the like and is expected to find useful applications as a raw material for composite materials excellent in heat resistance and mechanical strength.

We claim:

1. A styrenic copolymer which comprises structural units (I) represented by the formula (I)

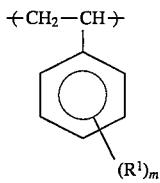

wherein $R^1$ is a hydrogen atom, halogen atom or substituent having at least one member selected from a carbon atom, tin atom and silicon atom; m is an integer from 1 to 5; and when m is a plural, $R^1$ may be the same or different and structural units (IX) represented by the formula (IX)

wherein at least two of $R^{21}$ to $R^{24}$ are each a substituent represented by —$(CH_2)_n$—COOR wherein R is a hydrogen atom; a metal belonging to the group I, II, III, IVA or VIII in the Periodic Table; an alkyl group having 1 to 20 carbon atoms which may be non-substituted or substituted by a substituent selected from a halogen atom, an alkylthio group, acylthio group, arylthio group and a halogenoalkoxy group; an alkenyl group having 2 to 5 carbon atoms; an alkynyl group having 2 to 5 carbon atoms; an arylalkyl group having 7 to 20 carbon atoms; or an aryl group having 6 to 20 carbon atoms which may be non-substituted or substituted by a substituent selected from a halogen atom, hydroxyl group and an alkyl group having 1 to 20 carbon atoms, and n is an integer from 0 to 10 or two of $R^{21}$ to $R^{24}$ together form a formula (X)

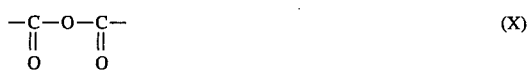

and the others of $R^{21}$ to $R^{24}$ are each a hydrogen atom; halogen atom; an alkyl group having 1 to 4 carbon atoms which may be non-substituted or substituted by a carboxyl group; an alkylthio group having 2 to 4 carbon atoms; alkoxy group having 1 to 4 carbon atoms; aryl group having 6 to 10 carbon atoms; aryloxy group having 6 to 10 carbon atoms; a nitro group or a trialkylsilyl group having 1 to 4 carbon atoms, said styrenic copolymer being characterized in that said structural unit (IX) is contained in an amount of 0.01 to 99.9 mol %, the intrinsic viscosity of said copolymer as measured in 1,2,4-trichlorobenzene at 135° C. ranges from 0.01 to 20 dl/g and the stereoregularity of the main chain of said structural unit (I) has a high degree of syndiotactic configuration.

2. A process for producing the styrenic copolymer as set forth in claim 1 which comprises polymerizing a styrenic monomer represented by the formula (III)

wherein $R^1$ and m are each as previously defined, in the presence of a catalyst comprising a transition metal compound and an aluminoxane thereafter adding to said polymer a comonomer represented by the general formula (XI)

wherein $R^{21}$ to $R^{24}$ are each as previously defined to proceed with copolymerization.

* * * * *